United States Patent
Ando et al.

(10) Patent No.: US 7,033,046 B2
(45) Date of Patent: Apr. 25, 2006

(54) LIGHTING DEVICE HAVING A LIGHT BLOCKING MECHANISM

(75) Inventors: Kazuhiro Ando, Saitama (JP); Yoshikazu Inoue, Kanagawa (JP); Motoya Sano, Tokyo (JP); Hiroshi Fukano, Chiba (JP); Wataru Nara, Kanagawa (JP); Akira Ota, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 42 days.

(21) Appl. No.: 10/612,933

(22) Filed: Jul. 7, 2003

(65) Prior Publication Data

US 2004/0070978 A1  Apr. 15, 2004

(30) Foreign Application Priority Data

Jul. 10, 2002  (JP) .............................. 2002-201747

(51) Int. Cl.
*F21V 13/10* (2006.01)

(52) U.S. Cl. ...................... 362/303; 303/351; 358/475

(58) Field of Classification Search ................ 362/303, 362/351, 3, 16, 125, 257, 302, 296–298, 362/317, 341, 346, 349, 360; 250/208.1, 250/578.1, 271, 200, 206, 555, 556, 216, 250/203.2, 580, 316.1, 591, 203.1; 382/322, 382/323; 358/496, 498, 475, 474, 400, 471
See application file for complete search history.

(56) References Cited

U.S. PATENT DOCUMENTS

| | | | |
|---|---|---|---|
| 3,754,135 A * | 8/1973 | Hulbert, Jr. ................. 362/303 |
| 4,209,825 A * | 6/1980 | Shackelford ................. 362/303 |
| 4,473,865 A * | 9/1984 | Landa ............................ 362/3 |
| 4,809,043 A | 2/1989 | Minami |
| 5,254,847 A * | 10/1993 | Hata et al. ................ 250/208.1 |
| 5,255,116 A * | 10/1993 | Araki et al. ................. 359/212 |
| 5,331,146 A * | 7/1994 | Tanimizu .................. 250/208.1 |
| 5,344,134 A | 9/1994 | Saeki et al. |
| 5,347,372 A | 9/1994 | Takahashi et al. |
| 5,547,793 A | 8/1996 | Kuramoto et al. |
| 5,574,538 A | 11/1996 | Takahashi et al. |
| 5,604,606 A * | 2/1997 | Miyashita et al. .......... 358/474 |

(Continued)

FOREIGN PATENT DOCUMENTS

EP      0 121 928      10/1984

(Continued)

OTHER PUBLICATIONS

U.S. Appl. No. 09/411,629, filed Oct. 1, 1999, Nara.

(Continued)

*Primary Examiner*—Sandra O'Shea
*Assistant Examiner*—Ismael Negron
(74) *Attorney, Agent, or Firm*—Oblon, Spivak, McClelland, Maier & Neustadt, P.C.

(57) ABSTRACT

A lighting device includes a light source that illuminates an object of illumination, a reflecting member provided opposite the light source so as to direct a first part of illuminating light emitted therefrom to the object of illumination, and a light-blocking member provided between the light source and the object of illumination and between the reflecting member and the object of illumination. The light-blocking member blocks the first directed part of the illuminating light and a second part of the illuminating light directly illuminating the object of illumination with a certain ratio of a light-blocking rate for the first directed part of the illuminating light to a light-blocking rate for the second directly illuminating part of the illuminating light.

20 Claims, 5 Drawing Sheets

U.S. PATENT DOCUMENTS

| | | | |
|---|---|---|---|
| 5,605,777 A | 2/1997 | Ando et al. | |
| 5,659,838 A | 8/1997 | Ando et al. | |
| 5,753,400 A | 5/1998 | Kuramoto et al. | |
| 5,859,734 A * | 1/1999 | Fujinawa et al. | 362/302 |
| 6,017,130 A * | 1/2000 | Saito et al. | 362/223 |
| 6,033,086 A * | 3/2000 | Bohn | 362/235 |
| 6,047,758 A | 4/2000 | Kuramoto et al. | |
| 6,091,927 A | 7/2000 | Hattori et al. | |
| 6,095,164 A | 8/2000 | Saitoh et al. | |
| RE36,963 E | 11/2000 | Ando et al. | |
| 6,172,356 B1 * | 1/2001 | Ogura et al. | 250/227.11 |
| 6,239,421 B1 * | 5/2001 | Nagata et al. | 250/208.1 |
| 6,285,853 B1 | 9/2001 | Sano | |
| RE37,645 E | 4/2002 | Takahashi et al. | |

FOREIGN PATENT DOCUMENTS

| | | |
|---|---|---|
| EP | 0 557 891 | 9/1993 |
| EP | 0 954 160 | 11/1999 |
| JP | 1-198169 | 8/1989 |
| JP | 5-199366 | 8/1993 |
| JP | 7-319082 | 12/1995 |

OTHER PUBLICATIONS

U.S. Appl. No. 09/662,173, filed Sep. 14, 2000, Nara.
U.S. Appl. No. 09/859,501, filed May 18, 2001, Soeda et al.
U.S. Appl. No. 09/940,589, filed Aug. 29, 2001, Inoue et al.
U.S. Appl. No. 09/961,256, filed Sep. 25, 2001, Nara.
U.S. Appl. No. 09/983,860, filed Oct. 26, 2001, Ando et al.
U.S. Appl. No. 10/097,595, filed Mar. 15, 2002, Nara.
U.S. Appl. No. 10/612,933, filed Jul. 7, 2003 Ando et al.

* cited by examiner

LIGHTING DEVICE HAVING A LIGHT BLOCKING MECHANISM

BACKGROUND OF THE INVENTION

1. Field of the Invention

The present invention generally relates to lighting devices and image sensors, and more particularly to a lighting device for an image sensor employed in an original reading device and an image sensor using the same.

2. Description of the Related Art

Image forming apparatuses that can read an original, such as copiers, facsimile machines, and scanners, employ a lighting device including a light source for reading.

Some lighting devices include, as an image sensor, a line sensor provided with a light source such as a fluorescent lamp or a halogen lamp running parallel to the main scanning direction of an original.

In a reading device employed in image forming apparatuses, the relationship between electric potential contrast (illuminance) on its latent image carrier and the amount of toner attached thereto is represented by the gamma characteristic, which affects the difference in density between an original and its copy. In the gamma characteristic, unevenness in illuminance also causes unevenness in the amount of toner attached, thereby adversely affecting the sharpness of the copied image. In order to solve this problem, Japanese Laid-Open Patent Applications No. 5-199366 and No. 7-319082 have proposed configurations for reducing unevenness in illuminance in a lighting device employed in a reading device.

According to the disclosure of each of the above-described patent applications, an auxiliary reflector for directing illuminating light emitted from a light source is provided in a position opposite the light source, and a shield member is provided between the light source and the surface of an original so that the quantity of light is uniformly distributed in the main scanning direction.

Normally, an original to be illuminated is scanned by receiving illuminating light from a lighting device while being kept flat on an original placement face. However, such originals as are undulated by wrinkles or stepped are also subjected to scanning.

Generally, in the case of illuminating a wrinkled or stepped original with only illuminating light from a light source, shade may be formed in the illuminated part of the original due to the singularity of the light source. As a result of the existence of the shade, information different from the actual original information is obtained as read information. In order to eliminate this disadvantage, two configurations have been proposed. That is, a plurality of light sources are provided, or an auxiliary reflector is provided as disclosed in the above-mentioned patent applications.

Of these two configurations, the latter is preferable to the former because the former has a disadvantage of requiring a space for the light sources to occupy in an apparatus in which the light sources are provided, which increases the apparatus in size. The latter, however, has the following new problem.

In the case of providing the auxiliary reflector, unevenness in lighting can be reduced by combining light emitted from a light source to directly illuminate the surface of an original with auxiliary light reflected back from the auxiliary reflector. However, the direct light from the light source and the auxiliary light from the auxiliary reflector are not balanced in quantity. Particularly, the auxiliary light is less in quantity than the direct light. Therefore, in the case of scanning a wrinkled or stepped original, the shade generated therein may not be eliminated depending on the intensity of the direct light. Further, in the case of providing the auxiliary reflector, it may be difficult to adjust its strength of reflection depending on the setting of its arrangement, thus making it difficult to obtain a balance in the quantities of light required for eliminating the shade.

SUMMARY OF THE INVENTION

Accordingly, it is a general object of the present invention to provide a lighting device in which the above-described disadvantage is eliminated, and an image sensor including the same.

A more specific object of the present invention is to provide a lighting device capable of eliminating shade generated in an original by appropriately setting a balance in the quantity of light between direct light from a light source and light reflected from an auxiliary reflector.

The above objects of the present invention are achieved by a lighting device including: a light source that illuminates an object of illumination; a reflecting member provided opposite the light source so as to direct a first part of illuminating light emitted therefrom to the object of illumination; and a light-blocking member provided between the light source and the object of illumination and between the reflecting member and the object of illumination so as to block the first directed part of the illuminating light and a second part of the illuminating light which second part directly illuminates the object of illumination with a certain ratio of a light-blocking rate for the first directed part of the illuminating light to a light-blocking rate for the second directly illuminating part of the illuminating light.

According to the above-described lighting device, the illuminating light emitted from the light source directly onto the object of illumination and the illuminating light reflected from the reflecting member to the object of illumination are blocked with a certain ratio being set between a light-blocking rate for the direct illuminating light and a light-blocking rate for the reflected illuminating light. Therefore, such imbalance in the quantity of light that the quantity of the reflected light is less than the quantity of the direct light can be prevented.

The above objects of the present invention are also achieved by an image sensor including a lighting device according to the present invention, a light-receiving element receiving light reflected from the object of illumination, and a focusing lens condensing the light received from the object of illumination toward the light-receiving element.

According to the above-described image sensor, the imbalance in quantity between the direct illuminating light from the light source and the illuminating light reflected from the reflecting member can be eliminated. Therefore, it can be ensured that the generation of shade is prevented in scanning a wrinkled or stepped object of illumination.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given below, with reference to the accompanying drawings, of an embodiment of the present invention.

Figure 1:
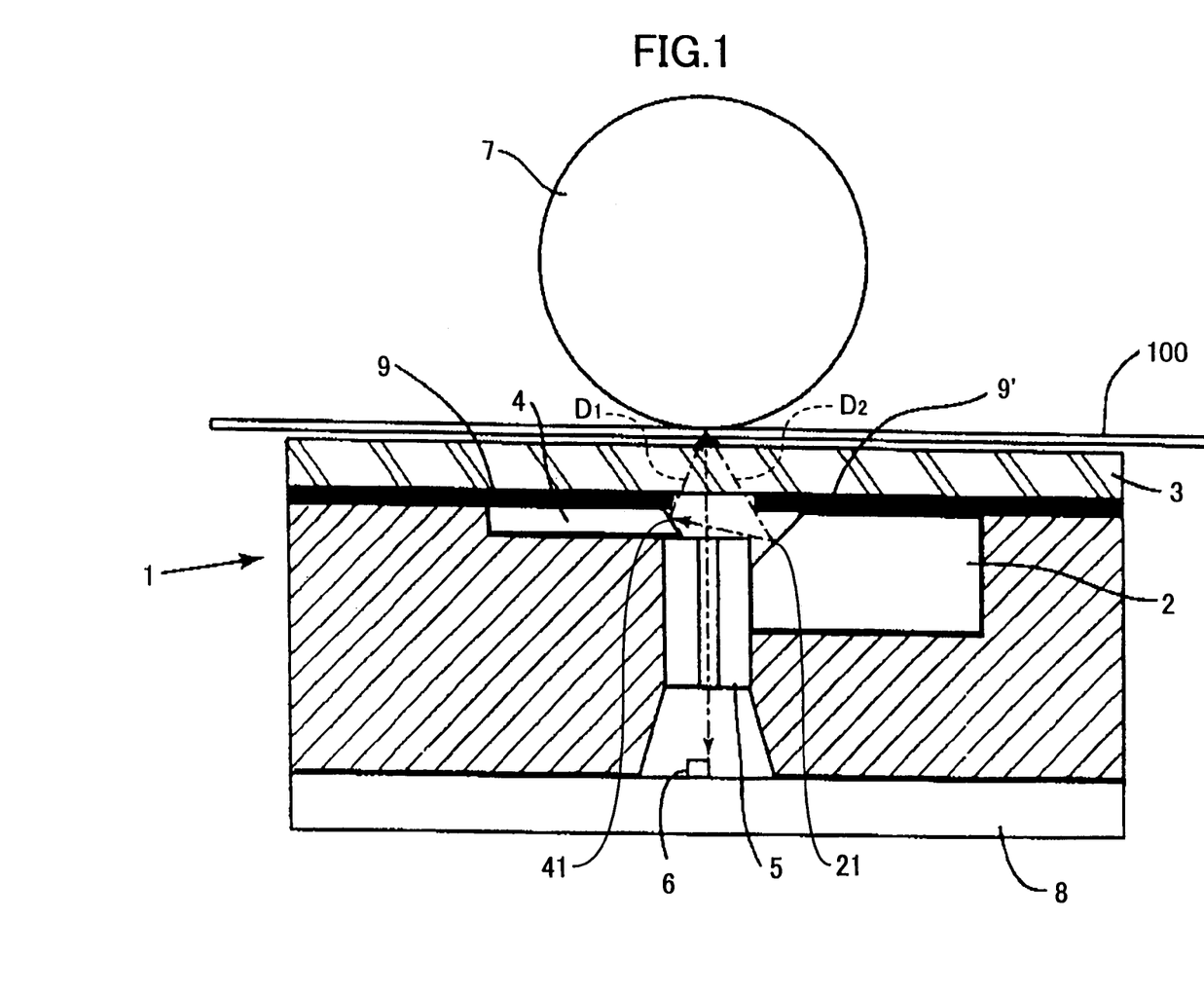
FIG. 1 is a sectional view of part of a lighting device according to an embodiment of the present invention.

FIG. 1 is a sectional view of part of a lighting device according to the embodiment of the present invention. Referring to FIG. 1, the lighting device is incorporated in the housing unit of an image sensor 1 including a light-receiving part. In the following description, the housing unit is referred to as the image sensor 1 for convenience of description.

The image sensor 1 includes a light source 2, light-transmitting material (light-transmitting member) 3 that transmits light, a reflecting member 4, a focusing optical transmitter 5, and a light-receiving element 6.

A linear light source such as a halogen lamp or a fluorescent lamp is employed as the light source 2. A transparent body such as glass is used as the light-transmitting material 3. An original 100, which is an object of illumination, can be placed on the upper surface of the light-transmitting material 3.

According to the configuration of FIG. 1, a rotatable transportation roller 7 is provided on the upper surface of the light-transmitting material 3 so that the original 100 can be transported on the light-transmitting material 3.

The reflecting member 4 includes a reflecting surface 41 that reflects light emitted from the light source 2 toward the original 100. The reflecting member 4 is provided so that the reflecting surface 41 opposes the light source 2 in a position closer to the light-transmitting material 3 than the light source 2 is, that is, in a position where the distance $D_1$ between the reflecting surface 41 of the reflecting member 4 and the original 100 can be smaller than the distance $D_2$ between a light emitting part 21 of the light source 2 and the original 100. The reflecting surface 41 of the reflecting member 4 is formed at such an angle as to direct the illuminating light emitted from the light source toward a position to be illuminated on the original 100. According to the configuration of FIG. 1, the reflecting member 4 is a resin molded product formed by injection molding and subjected to aluminum vapor deposition so that the reflectance of its reflecting surface 41 is set to 85% or more.

According to the configuration of FIG. 1, the reflecting member 4 is positioned so as not to obstruct the optical path of the reflected light from the original 100 with the reflecting surface 41 being positioned between the light-transmitting material 3 and the focusing optical transmitter 5 so as to be closer to the light-transmitting material 3 than the light emitting part 21 of the light source 2 is so that the intensity of the reflected light from the reflecting surface 41 can be increased as much as possible. According to this configuration, the reflecting member 4 is positioned close to the light-transmitting material 3. Therefore, the height of the entire unit including the reflecting member 4 can be reduced, so that the image sensor 1 can be reduced in size.

The focusing optical transmitter 5 is an optical lens that condenses the reflected light from the original 100 toward the light-receiving element 6.

The light-receiving element 6 is a photoelectric conversion element provided on an electric circuit board 8 attached to the bottom part of the image sensor 1.

Light-blocking (shading) members 9 and 9' are provided to the light-transmitting material 3. According to the configuration of FIG. 1, the light-blocking member 9 is provided between the lower surface of the light-transmitting material 3 and the reflecting member 4, and the light-blocking member 9' is provided between the lower surface of the light-transmitting material 3 and the light source 2.

The light-blocking members 9 and 9' are formed of black print parts provided in the positions corresponding to the spaces between the light-transmitting material 3 and the reflecting member 4 and between the light-transmitting material 3 and the light source 2, respectively. The light-blocking members 9 and 9' are held on the lower surface of the light-transmitting material 3 as its parts.

The light-blocking members 9 and 9' are provided opposite each other so that the optical paths of the illuminating light from the light source 2, the illuminating light from the reflecting member 4, and the reflected light from the original 100 are formed in the space between the light-blocking members 9 and 9'.

The light-blocking members 9 and 9' are positioned across the optical path of the reflected light from the original 100 from each other so that the light directly emitted onto the original 100 from the light source 2 and the light emitted onto the original 100 via the reflecting member 4 are balanced in the quantity of light.

In other words, the light-blocking member 9' is positioned so as to be able to approximate the quantity of the direct illuminating light from the light source 2 to the original 100 to the quantity of the illuminating light from the reflecting member 4 to the original 100 by controlling the quantity of the direct illuminating light from the light source 2. As a result, a certain ratio is set between a shading (light-blocking) rate for the direct light from the light source 2 and a shading rate for the reflected light from the reflecting member 4 with the degree of shading for the direct light from the light source 2 being higher than the degree of shading for the reflected light from the reflecting member 4.

According to the above-described configuration, different shading rates can be set for the direct light from the light source 2 and the light reflected from the reflecting member 4 to the original 100 positioned on the light-transmitting material 3. Accordingly, by increasing the shading rate for the direct light from the light source 2, the direct light from the light source 2 and the light reflected from the reflecting member 4 can be balanced in quantity. As a result, the direct light from the light source 2 is prevented from being stronger than the light reflected from the reflecting member 4 so as to avoid creating the same situation as in the case of using only the direct light from the light source 2. Consequently, the generation of shade on the original 100 can be prevented.

Particularly, when the surface of the original 100 is wrinkled or stepped, the same result as described above can be obtained by establishing balance in the quantities of light without using a plurality of light sources.

The light-blocking members 9 and 9' may only be required to have such a configuration as to obtain a shading function. Therefore, when the light-blocking members 9 and 9' are formed integrally with the light-transmitting material 3, the light-blocking members 9 and 9' may be formed by performing, instead of the above-described processing for light blocking, or not transmitting light, surface processing for scattering the illuminating light so that the scattered light does not enter the optical paths of the illuminating light and the light reflected from the original 100.

According to this embodiment, the shading members 9 and 9' are provided to the lower surface of the light-transmitting material 3 by printing. Therefore, it is not necessary to form the shading members 9 and 9' as special members to be attached, and the shading members 9 and 9' can be formed by simple processing such as coloring without an increase in cost at the time of forming the light-transmitting material 3.

Instead of being formed integrally with the light-transmitting material 3 by performing the above-described printing or surface processing on the light-transmitting material 3 itself, the light-blocking members 9 and 9' may be formed as members separate from the light-transmitting material 3 and provided thereto. In this case, the light-blocking members 9 and 9' may be formed of film-like thin strips, and applied to the light-transmitting material 3 as a sandwich structure between the light-transmitting material 3 and the remaining parts of the image sensor 1. Thereby, the light-blocking members 9 and 9' may be provided, incorporated in the light-transmitting material 3.

Since the light-blocking members 9 and 9' are provided to the light-transmitting material 3 as part thereof, there is no need to enlarge a space for the light-blocking members 9 and 9'. Therefore, the height of (the entire housing unit of) the image sensor 1 can be reduced. Further, since the light-blocking members 9 and 9' are incorporated in the light-transmitting material 3, it is possible to manufacture the light-blocking members 9 and 9' in the process of manufacturing the light-transmitting material 3. Therefore, the manufacturing method of the lighting device can be simplified. Further, since the light-blocking members 9 and 9' are positioned on the light-transmitting material 3 that the illuminating light directly enters, the light-blocking members 9 and 9' can be positioned with accuracy with respect to the original 100 so that the light-blocking positions can be determined with accuracy with respect to the original 100.

The paired light-blocking members 9 and 9' shown in FIG. 1 may be replaced by a single thin film in which an aperture for light paths is formed. The light-blocking members 9 and 9' may also be formed integrally with the light-transmitting material 3 so as to have an aperture formed thereon by performing printing or surface processing on the light-transmitting material 3.

The reflecting member 4 is not limited to a molded component. FIGS. 2 through 5 show variations of the reflecting member 4 according to this embodiment. In FIGS. 2 through 5, the same elements as those of FIG. 1 are referred to by the same numerals.

Figure 2:
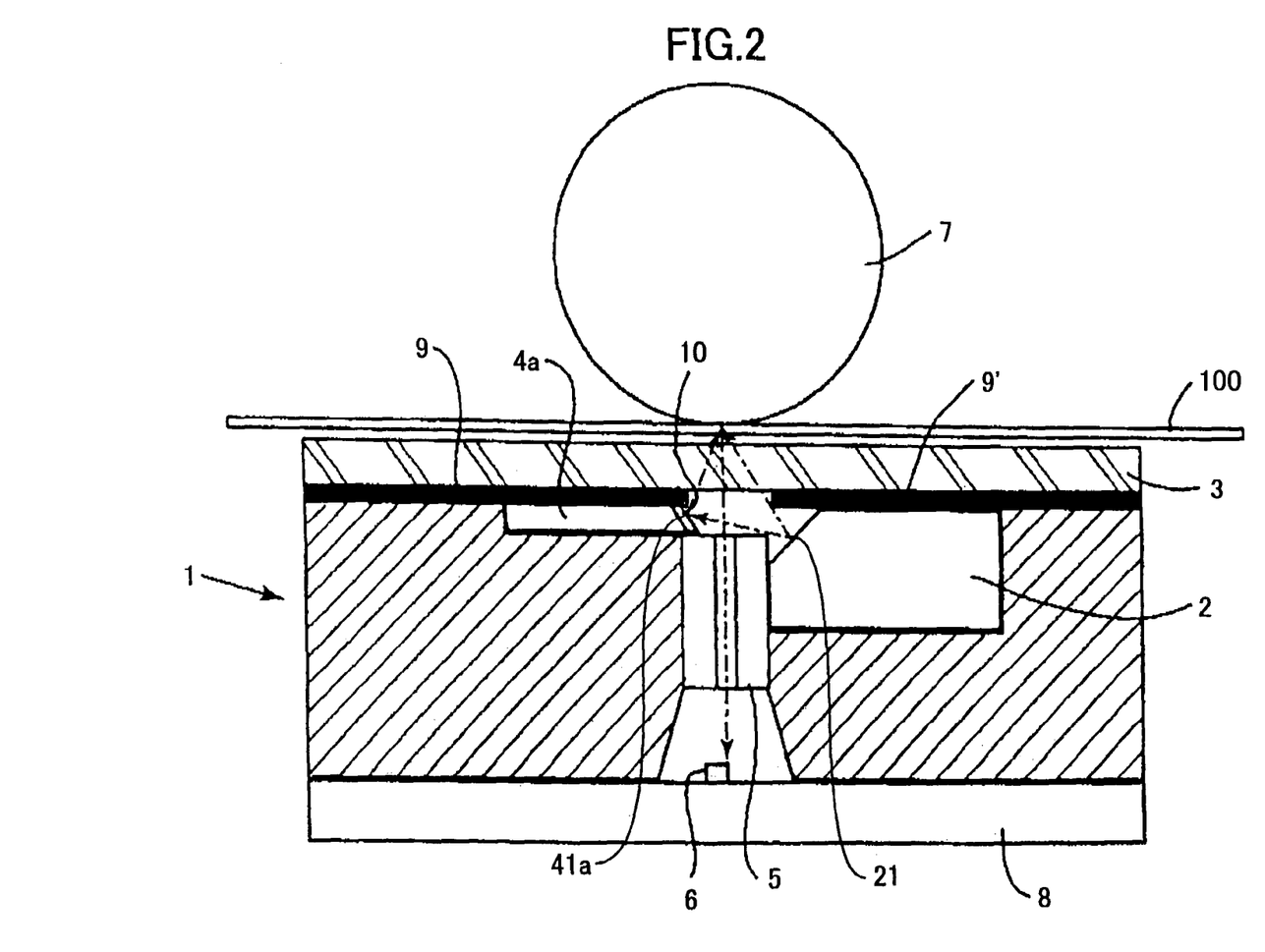
FIG. 2 is a diagram for illustrating a first variation of a reflecting member of the lighting device according to the embodiment of the present invention.

FIG. 2 is a diagram for illustrating a reflecting member 4a that is a first variation of the reflecting member 4. Referring to FIG. 2, a reflecting surface 41a of the reflecting member 4a is formed by applying a reflector tape 10 formed by performing aluminum vapor deposition on a base material.

Figure 3:
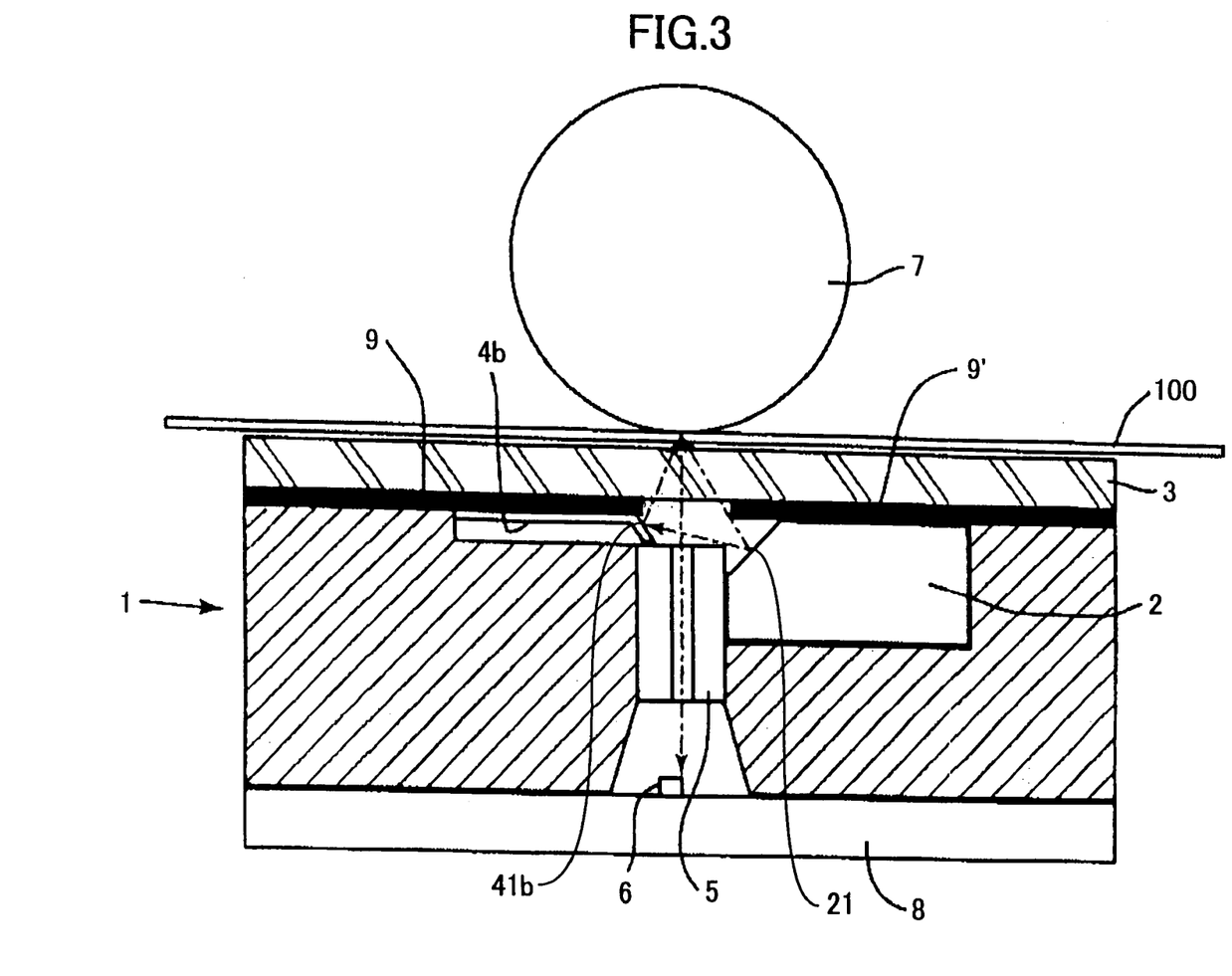
FIG. 3 is a diagram for illustrating a second variation of the reflecting member of the lighting device according to the embodiment of the present invention.

FIG. 3 is a diagram for illustrating a reflecting member 4b that is a second variation of the reflecting member 4. Referring to FIG. 3, the reflecting member 4b is formed of a sheet metal member having a surface plated with a reflecting material. The sheet metal member is bent so as to form a reflecting surface 41b of the reflecting member 4b.

Figure 4:
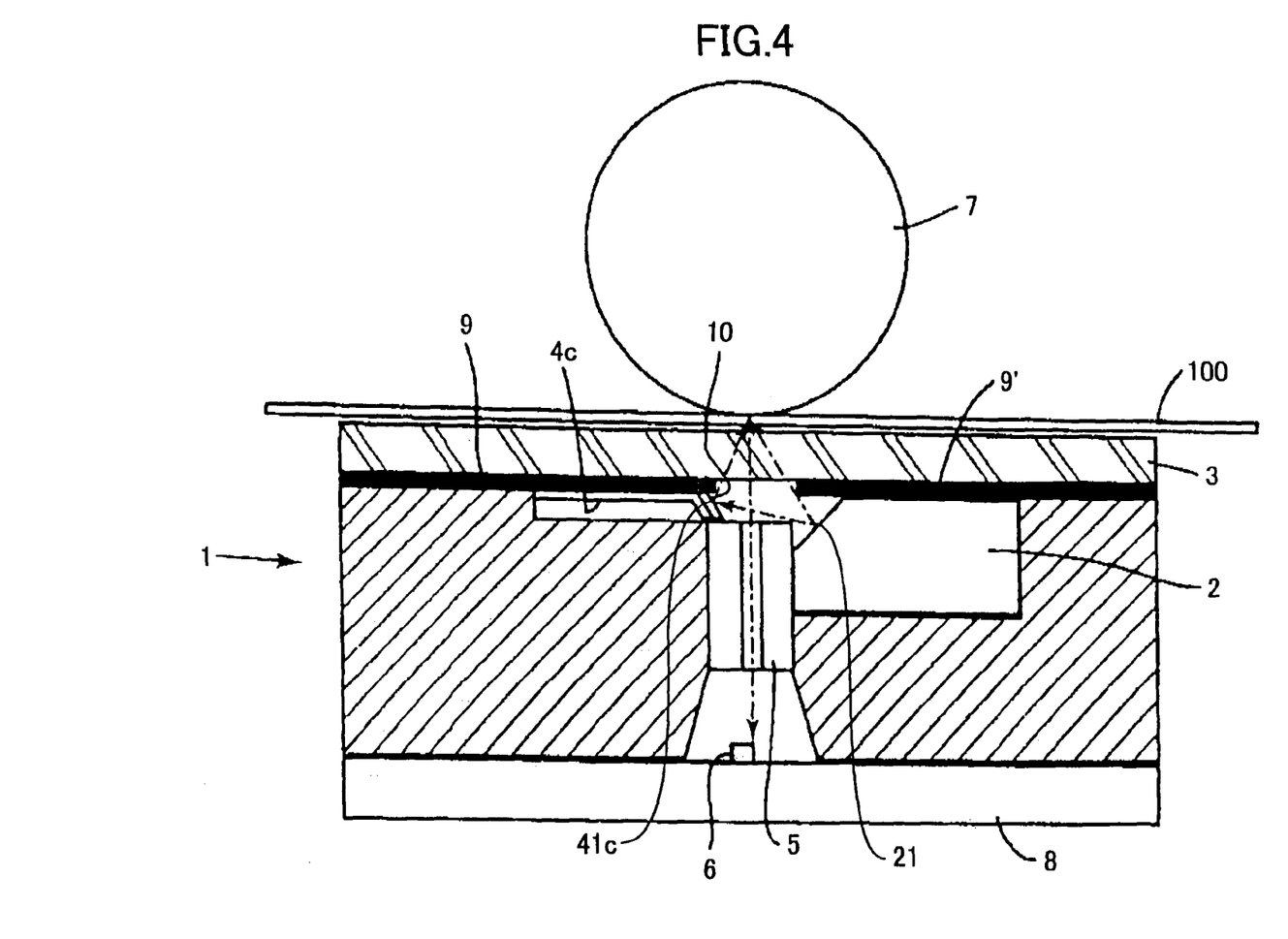
FIG. 4 is a diagram for illustrating a third variation of the reflecting member of the lighting device according to the embodiment of the present invention.

FIG. 4 is a diagram for illustrating a reflecting member 4c that is a third variation of the reflecting member 4. Referring to FIG. 4, the reflecting member 4c is formed of an unplated sheet metal member having a bent part. The reflector tape 10 shown in FIG. 2 is applied to the bent part so as to form a reflecting surface 41c of the reflecting member 4c.

Figure 5:
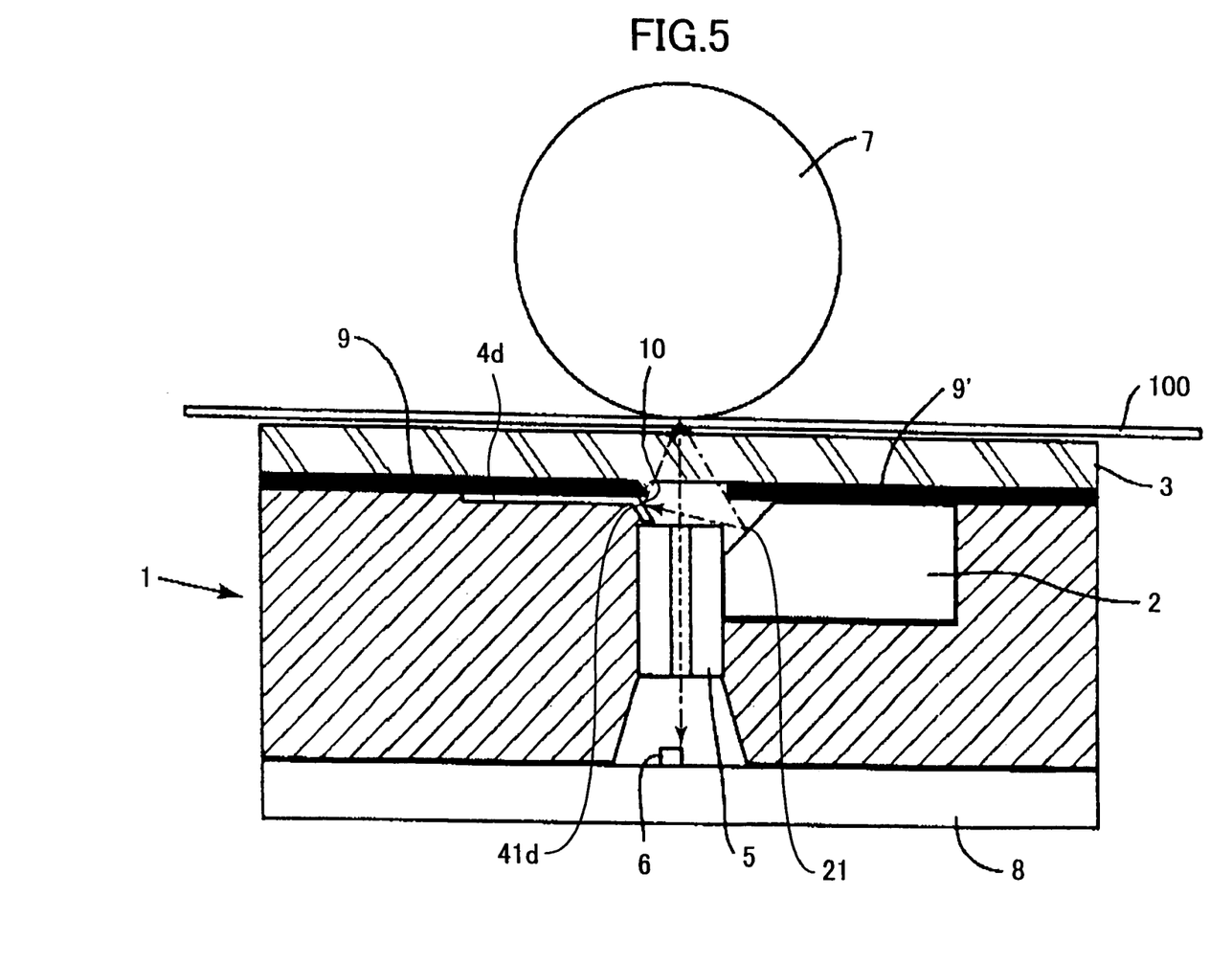
FIG. 5 is a diagram for illustrating a fourth variation of the reflecting member of the lighting device according to the embodiment of the present invention.

FIG. 5 is a diagram for illustrating a reflecting member 4d that is a fourth variation of the reflecting member 4. Referring to FIG. 5, the reflecting member 4d is formed of the reflector tape 10 shown in FIG. 2. The reflector tape 10 is applied to part of the housing unit of the image sensor 1 including a bent surface so that the bent part of the reflector tape 10 forms a reflecting surface 41d of the reflecting member 4d.

According to the configuration of FIG. 1, the light source 2 emits illuminating light in the upward direction. According to the present invention, however, the direction in which the light source 2 emits light can be determined based on the setting conditions of the image sensor 1 or the scanning position of the original 100. For instance, if the original 100 is positioned below the light source 2, the light-emitting direction of the light source 2 can be adjusted to the downward direction in accordance with the position of the original 100. Such a layout or configuration may be realized easily by, for instance, turning the configuration of FIG. 1 upside down.

The present invention is not limited to the specifically disclosed embodiment, and variations and modifications may be made without departing from the scope of the present invention.

The present application is based on Japanese priority application No. 2002-201747, filed on Jul. 10, 2002, the entire contents of which are hereby incorporated by reference.

What is claimed is:

1. A lighting device, comprising:
   a light source that illuminates an object of illumination, having first and second illuminating light portions;
   a reflecting member provided opposite said light source so as to direct the first illuminating light portion emitted therefrom to the object of illumination;
   said second illuminating light portion directly illuminating the object of illumination; and
   a light-blocking member provided between said light source and the object of illumination, and between said reflecting member and the object of illumination so as to block at least a part of both the first and second illuminating light portions with a certain ratio of a light-blocking rate for the first illuminating light portion to a light-blocking rate for the second illuminating light portion of the illuminating light, so that the first illuminating light portion and the second illuminating light portion are balanced in quantity.

2. The lighting device as claimed in claim 1, wherein said reflecting member is positioned so that a distance between said reflecting member to the object of illumination is less than a distance between said light source and the object of illumination.

3. The lighting device as claimed in claim 1, wherein the light-blocking rate for the second illuminating portion is greater than the light-blocking rate for the first illuminating portion.

4. The lighting device as claimed in claim 1, wherein said reflecting member is positioned so that the first illuminating portion and the second illuminating portion are balanced in quantity.

5. An image sensor, comprising:
   a lighting device as set forth in claim 1;
   a light-receiving element receiving light reflected from the object of illumination; and a focusing lens condensing the light received from the object of illumination toward said light-receiving element.

6. The lighting device as claimed in claim 1, wherein the light-blocking member is positioned so that the first illuminating portion and the second illuminating portion are balanced in quantity.

7. The lighting device as claimed in claim 1, further comprising a light-transmitting member on which the object of illumination is placeable, the light-transmitting member being provided between said reflecting member and the object of illumination,
   wherein said light-blocking member is provided to said light-transmitting member.

8. The lighting device as claimed in claim 7, wherein said light-blocking member is held on said light-transmitting member and provided as part of said light-transmitting member.

9. The lighting device as claimed in claim 8, wherein said light-blocking member is formed integrally with said light-transmitting member by printing.

10. The lighting device as claimed in claim 8, wherein said light-blocking member is formed integrally with said light-transmitting member by performing surfacing processing thereon.

11. A lighting device, comprising:
   light source means for illuminating an object of illumination, having first and second illuminating light portions;
   reflecting means provided opposite said light source means for directing the first illuminating light portion emitted therefrom to the object of illumination;
   said second illuminating light portion directly illuminating the object of illumination; and
   light-blocking means provided between said light source means and the object of illumination, and between said reflecting means and the object of illumination for blocking at least a part of both the first and second illuminating light portions with a certain ratio of a light-blocking rate for the first illuminating light portion to a light-blocking rate for the second illuminating light portion of the illuminating light, so that the first illuminating light portion and the second illuminating light portion are balanced in quantity.

12. The lighting device as claimed in claim 11, wherein said reflecting means is positioned so that a distance between said reflecting means to the object of illumination is less than a distance between said light source means and the object of illumination.

13. The lighting device as claimed in claim 11, wherein the light-blocking rate for the second illuminating portion is greater than the light-blocking rate for the first illuminating portion.

14. The lighting device as claimed in claim 11,
   wherein said reflecting means is positioned so that the first illuminating portion and the second illuminating portion are balanced in quantity.

15. An image sensor, comprising:
   a lighting device as set forth in claim 11;
   light-receiving means for receiving light reflected from the object of illumination; and
   focusing means for condensing the light received from the object of illumination toward said light-receiving means.

16. The lighting device as claimed in claim 11, wherein the light-blocking means is positioned so that the first illuminating portion and the second illuminating portion are balanced in quantity.

17. The lighting device as claimed in claim 11, further comprising light-transmitting means on which the object of illumination is placeable, the light-transmitting means being provided between said reflecting means and the object of illumination,
   wherein said light-blocking means is provided to said light-transmitting means.

18. The lighting device as claimed in claim 17, wherein said light-blocking means is held on said light-transmitting means and provided as part of said light-transmitting means.

19. The lighting device as claimed in claim 18, wherein said light-blocking means is formed integrally with said light-transmitting means by printing.

20. The lighting device as claimed in claim 18, wherein said light-blocking means is formed integrally with said light-transmitting means by performing surfacing processing thereon.

* * * * *